United States Patent
Hollowell

[11] 3,710,412
[45] Jan. 16, 1973

[54] VACUUM TRASH COLLECTOR

[76] Inventor: John R. Hollowell, 3567 Greenfield, Dearborn, Mich. 48126

[22] Filed: June 11, 1971

[21] Appl. No.: 152,223

[52] U.S. Cl. .....................15/340, 15/323, 15/352, 15/353
[51] Int. Cl. .................................................A47l 9/00
[58] Field of Search ........15/327 D, 327 R, 340, 352, 15/353, 314

[56] References Cited

UNITED STATES PATENTS

| | | | |
|---|---|---|---|
| 2,300,266 | 10/1942 | Smellie | 15/350 X |
| 2,887,714 | 5/1959 | Hanson | 15/340 |
| 3,063,082 | 11/1963 | Rosenberg | 15/353 X |
| 3,150,404 | 9/1964 | Johnson | 15/314 X |
| 3,550,181 | 12/1970 | Dolan et al. | 15/353 X |

FOREIGN PATENTS OR APPLICATIONS

| | | | |
|---|---|---|---|
| 623,871 | 1/1936 | Germany | 15/314 |
| 686,519 | 1/1940 | Germany | 15/314 |

Primary Examiner—Edward L. Roberts
Assistant Examiner—C. K. Moore
Attorney—J. King Harness et al.

[57] ABSTRACT

A trash collector mountable on a cart. The collector comprises a pivoted cylindrical bin having a hinged lid surmounted by a vacuum blower. A flexible hose of inverted U shape has a nozzle at its outer end, the inner end entering tangentially into the lid. The hose is supported by a leaf spring pivoted at its inner end, the nozzle being controlled by a handle through a telescoping connection.

22 Claims, 4 Drawing Figures

PATENTED JAN 16 1973

INVENTOR.
John R. Hollowell
BY
Harness, Dickey-Pierce
ATTORNEYS

PATENTED JAN 16 1973

INVENTOR.
John R. Hollowell
BY
Harness, Dickey & Pierce
ATTORNEYS.

VACUUM TRASH COLLECTOR

BACKGROUND OF THE INVENTION

1. Field of the Invention

The invention relates to trash pickup devices, and more particularly to mobile units of a vacuum type for collecting debris such as leaves or sweepings over a wide area, or along a roadway.

2. Description of the Prior Art

No prior patent is known which has the features of the present invention. Sedgwick et al. U.S. Pat. No. 2,878,508 shows a trash and litter collecting apparatus on a trailer type vehicle. Other examples of devices in the same general category are the following U.S. Pat. Nos.

1,015,637
2,533,638
2,887,714
3,199,277

BRIEF SUMMARY OF THE INVENTION

The vacuum trash collector of this invention comprises a rigid U-shaped member easily mountable on a mobile cart by a slip-on tube. A cylindrical collecting bin is pivoted to the member as is a swingable lid which supports a vacuum blower. A perforated bowl-shaped inlet baffle is secured to the blower shaft and is disposed within the lid. A flexible hose extends upwardly and outwardly from the lid and then downwardly to a nozzle, the operator sitting beneath the hose. The nozzle is controlled by a handle through a telescoping connection connected to a midportion of the hose support.

The hose is supported by a flexible spring, the inner end of which is pivotally mounted for transverse rocking movement on the lid support. A counterbalance spring for the lid permits it to be lifted along with the blower.

The nozzle has a guard spacing it from the ground and so shaped as to be of assistance in loosening debris. The material drawn through the tube enters the lid in tangential fashion and is thrown to the outside of the bin where it will collect. The bin is tiltable to different positions for emptying or placing a bag liner therein if desired. The bin may also be provided with a bag holding bracket.

The construction is such that the nozzle is infinitely adjustable over wide areas both from side to side and from front to rear, and is movable very easily since the entire tube and nozzle are supported by the leaf spring. The tube may be replaced easily by a pair of clamps.

DESCRIPTION OF THE PREFERRED EMBODIMENT

Figure 1:
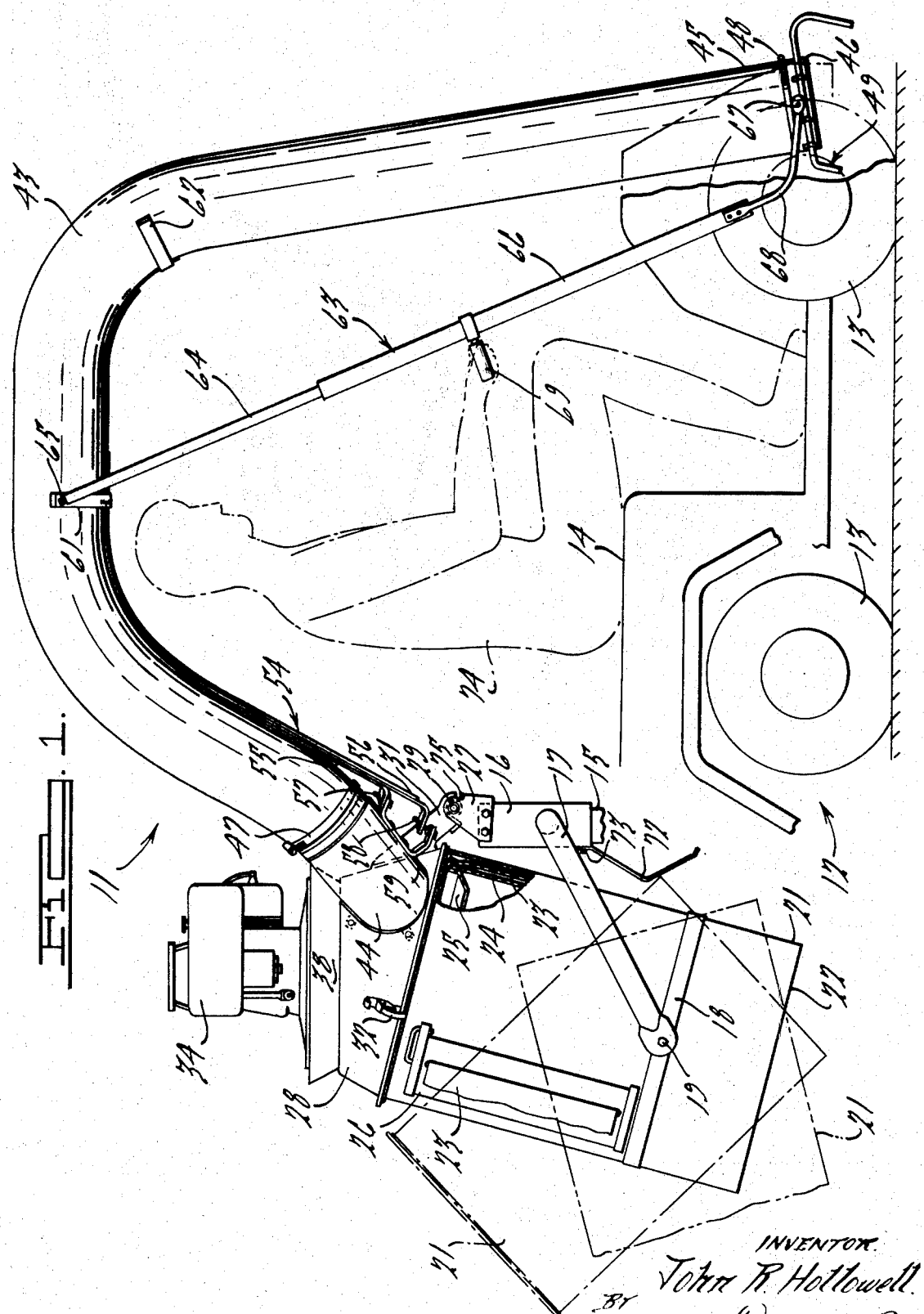
FIG. 1 is a side elevational view of the device shown with portions of a cart on which it is mounted.

The vacuum trash collector is generally indicated at 11 and is adapted to be mounted on a vehicle such as a cart generally indicated at 12 which is partially shown in FIG. 1. The cart may be any one of various types for movement along roadways or on other terrain to collect debris such as leaves or roadside trash. The vehicle has wheels 13, and operator's seat 14 and a vertical post shown partially at 15 behind seat 14 on which unit 11 is supported. Forward movement of vehicle 12 is to the right in FIG. 1.

Unit 11 comprises a vertical socket 16 mountable on post 15 and a U-shaped member 17 secured to and extending downwardly and rearwardly from socket 16. Socket 16 and said U-shaped member together comprise a frame. A circular clamp 18 is pivoted at 19 to the arms of member 17 and supports a bin 21. This bin is of cylindrical or barrel shape having a closed bottom 22 and an open top. As shown, the bin is lined with a plastic bag 23 having a rigid liner 24 therewithin, the liner having an inwardly extending upper rim 25. This bag and liner construction is more fully described in my co-pending application, Ser. No. 150,367, filed June 7, 1971. For the purposes of this invention, however, bin 21 could be used without a bag 23 or liner 24.

Bin 21 is tiltable on pivot 19 between various positions. The solid lines in FIG. 1 show the bin in its collection position, the dot-dash lines show it in a position for placing liner 24 and bag 23 therein and the double dot-dash lines show it in a position to be emptied. A holder 26 is shown on the bin for storing and dispensing additional bags 23.

Figure 2:
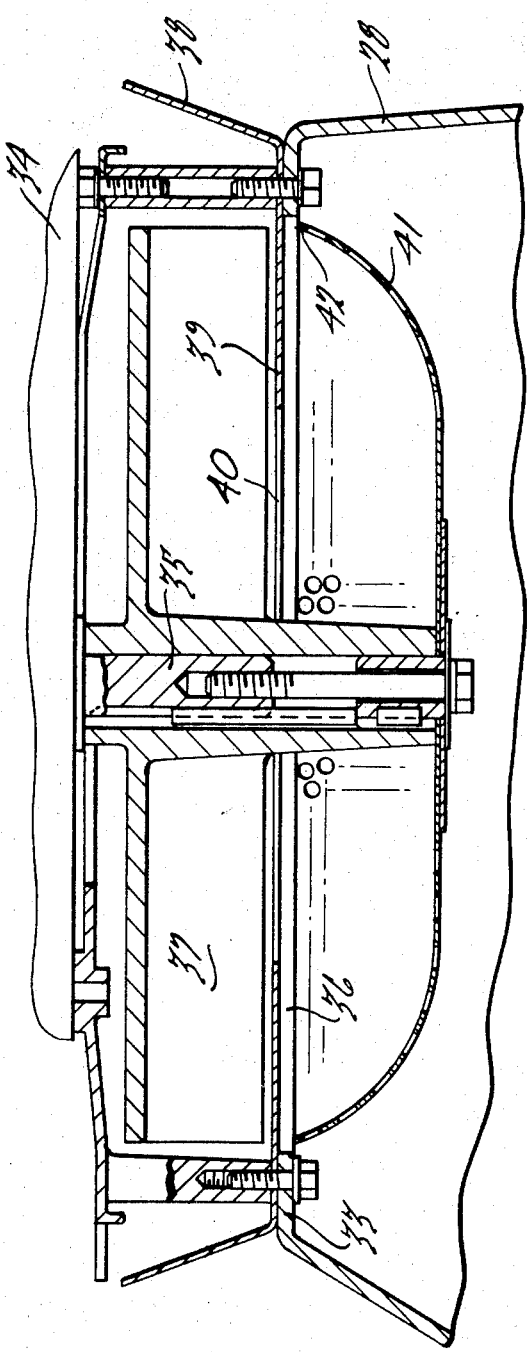
FIG. 2 is an enlarged cross-sectional view in elevation of the blower baffle and its associated parts.
Figure 4:
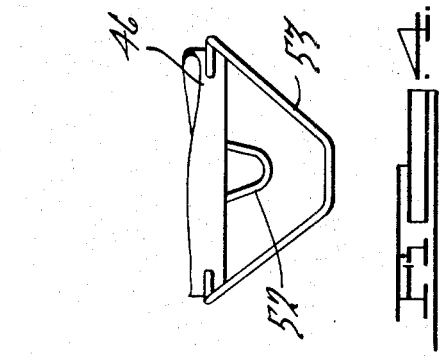
FIG. 4 is an elevational view thereof taken in the direction for FIG. 3.

A bracket 27 is secured to socket 16 and a lid 28 for bin 21 is pivoted at 29 to bracket 27 by means of an extension 31. Lid 28 is securable to the upper rim of bin 21 by clamps 32. When so connected, bin 21 is inclined slightly forwardly from the vertical as seen in FIG. 1. The lid is so shaped, however, that its top 33 (FIG. 2) is horizontal to support a vacuum blower 34. This blower has a downwardly extending shaft 35 passing through a central aperture 36 in lid top 33. An impeller 37 is mounted on shaft 35 and draws air upwardly. A guard 38 surrounds impeller 37 and has an annular flat portion 39 partially overlapping opening 36. The opening 40 in portion 39 forms the inlet of the impeller.

A baffle 41 is secured to the lower end of shaft 35 below opening 36. Baffle 41 is of perforated dished shape, its upper edge 42 being closely adjacent the outer edge of aperture 36 so that the baffle overlaps inlet 40 of the impeller. The baffle will rotate with the vacuum blower so that any trash, leaves or other debris which come in contact with the baffle will be thrown off by centrifugal force and thus prevented from clogging the blower.

Lid 28 forms a plenum chamber into which the air and debris are drawn through a flexible hose 43. One end of this hose enters an inlet 44 of lid 28 tangentially so that the air will be swirled around within the lid with the debris being thrown out by centrifugal force and dropping into bin 21.

Hose 43 arches above seat 14, thus leaving room for an operator to sit, and then extends downwardly to its outer end 45. A nozzle 46 is secured to the outer end 45 of hose 43. The means for securing hose 43 to inlet 44 and nozzle 46 comprises a pair of band clamps 47 and 48 respectively. Thus, the hose can be replaced merely by unscrewing the clamps.

Figure 3:
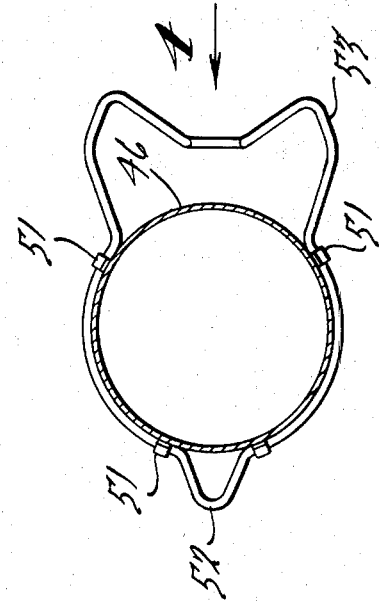
FIG. 3 is a top plan view of the nozzle guard.

A nozzle guard generally indicated at 49 is secured to nozzle 46 by a plurality of clips 51 (FIG. 3). This guard is a shaped rod having a lower rearward leg 52 and a higher forward leg 53. The central portions of these two legs are adapted to engage the ground so as to maintain the mouth of nozzle 46 spaced therefrom and insure that air will always flow into the hose. The narrow ground-engaging portions of legs 52 and 53 may be maneuvered to scrape and loosen debris which is wet or stuck to the ground.

The means for supporting hose 43 and nozzle 46 comprises a leaf spring assembly generally indicated at 54 in FIG. 1. This assembly comprises three leaf springs of progressively shorter length, the longest leaf 55 being adjacent the hose. This leaf and intermediate leaf 56 have coaxial pivots 57 and 58 respectively on a bracket 59 secured to the underside of inlet 44. U-shaped brackets 61 and 62 spaced along the leaf spring assembly partially surround and support hose 43. A telescoping nozzle support generally indicated at 63 extends between bracket 61 and the nozzle. This support comprises an upper rod 64 pivoted at 65 to bracket 61, and a lower rod 66 pivoted at 67 by a forked lower end 68 to nozzle 46. A handle 69 is secured to a lower rod 66 by a bracket 71 and extends at right angles thereto. Thus, the operator may grasp handle 69 and maneuver nozzle 46 by lifting or lowering the nozzle, moving it forward or backwards, or swinging it from side to side. All of these movements will be permitted by the combination of inner pivot 57, 58, leaf spring 54, telescoping support 63 and the flexibility of the hose itself. Thus, a very wide area of maneuverability is afforded by the device with the operator sitting in one position. Substantially, the entire weight of the hose, nozzle and telescoping support will be carried by leaf spring assembly 54 so that the effort of the operator can be devoted entirely to maneuvering rather than supporting the device.

A detent leaf spring 72 is secured at one end 73 to socket 16, the spring being of angled construction so as to hold bin 21 in its dot-dash line position when desired. Further counterclockwise movement of the bin will carry it past spring 72 to the discharge position shown in double dot-dash lines.

In operation, the operator shown in dot-dash lines at 74 will be seated on seat 14 of the cart which may be propelled and steered by any conventional means (not shown). The operator will grasp handle 69, and, with the vehicle moving forwardly (to the right in FIG. 1) and blower 34 operating, will direct nozzle 46 toward the leaves or other debris. These will be loosened by guard 49 and drawn upwardly through tube 43 into the plenum chamber formed by lid 28. By centrifugal force the debris will be thrown outwardly against the inner surface of the lid and will drop into bin 21. If liner 24 is present, its lip 25 will help to retain the debris in the bin. Baffle 41 will stop any debris tending to enter the blower and will throw it outwardly by centrifugal force so that it will drop into the bin.

During operation, the operator may direct nozzle 46 either alongside or in front of car 12. When it is desired to empty the bin, clamps 32 will be released and lid 28 along with blower 34 swung upwardly. For this purpose a counterbalance spring 75 may be provided on pivot 29, this spring having one end engaging bracket 27 and the other bracket 31. Spring 75 is strong enough to lift not only lid 28 but the parts mounted thereon including blower 34 and hose inlet 44.

Bin 21 may then be swung to its double dot-dash line position and emptied. If it is desired to re-line bin 21 with a bag 23, such a bag may be withdrawn from container 26 and torn off a roll or otherwise removed, and then placed in bin 21 along with a liner 24 if this is being used. The bin would then be swung back to its solid line position and lid 28 reclamped thereto.

What is claimed is:

1. In a vacuum trash collector for mounting on a vehicle, a frame securable to the vehicle, a bin supported by said frame for movement between an upper trash receiving position and a lower emptying position, a lid for said bin, a vacuum blower mounted on said lid, means mounting said lid on said frame for movement between a first position attached to said bin and a second position retracted therefrom so that the bin may be moved to its emptying position, a flexible hose having an inner end leading into said lid which acts as a plenum chamber and an outer end carrying a nozzle, and means accessible to an operator for maneuvering said nozzle.

2. The combination according to claim 1, said bin being barrel-shaped, said bin supporting means comprising a pivotal connection to said frame.

3. The combination according to claim 1, said bin being of cylindrical shape and inclined when in its receiving position, said lid being of frustoconical shape whereby its top is horizontal when it is secured to the bin, said vacuum blower being mounted on the top of said lid.

4. The combination according to claim 3, said blower having a shaft extending downwardly into the plenum chamber formed by said lid, and a perforated baffle for said blower secured to the shaft below the blower and rotatable therewith, whereby the debris collecting on said baffle will be thrown outwardly by centrifugal force.

5. The combination according to claim 4, said baffle being of dished construction, the top of said lid having an air opening for said blower, the outer edge of said baffle being adjacent said opening.

6. The combination according to claim 1, said blower being mounted on top of said lid and having an impeller, an opening in said lid top for the passage of air and a perforated baffle rotatable with said impeller and having an outer edge adjacent said opening, whereby debris collecting on said baffle will be thrown outwardly by centrifugal force.

7. The combination according to claim 1, said lid being pivotally mounted on said frame, and a counterbalance spring urging said lid toward its retracted position.

8. The combination according to claim 1, said means for supporting the flexible hose comprising a leaf spring holding a central portion of the hose above an operator's head, whereby the outer hose portion descends in front of the operator.

9. The combination according to claim 8, the inner end of said leaf spring being pivotally mounted, whereby said flexible hose may be swung from side to side.

10. The combination according to claim 9, said leaf spring pivotal mounting being on said lid, the lid being pivotally mounted to said frame and counterbalanced toward its retracted position.

11. The combination according to claim 1, said flexible hose being resiliently supported so that its central portion is above the operator and the hose descends in front of the operator, and a control rod having a handle and connected to said nozzle.

12. The combination according to claim 11, said resilient hose supporting means comprising a leaf spring extending under the hose, a plurality of U-shaped brackets for the hose carried by said leaf spring, said control rod being telescoping with its upper end secured to one of said brackets and its lower end to the nozzle.

13. The combination according to claim 1, said nozzle being further provided with a guard comprising shaped front and rear feet, these feet being secured to and extending downwardly from the nozzle to hold said nozzle off the ground, the feet having relatively narrow ground-engaging intermediate portions for loosening debris.

14. The combination according to claim 13, an intermediate portion of said flexible hose being supported above the operator's head, and a telescoping control rod pivotally connected at one end to said flexible hose support above the operator and at the other end to said nozzle, said telescoping rod having a handle for operator control.

15. The combination according to claim 14, said hose support comprising a leaf spring pivotally connected at its inner end to said lid for sideways swinging movement, and a pivotal connection for said lid on said frame for retracting movement away from said bin.

16. The combination according to claim 1, said frame including a vertical socket for securing said frame on a post mounted on the vehicle.

17. The combination according to claim 16, said frame further comprising a U-shaped member to which said bin is pivotally supported.

18. The combination according to claim 1, said bin being further provided with a plastic bag, and a rigid tubular liner within said bag.

19. In a mobile vacuum trash collector, a frame, a trash collecting bin movably mounted on said frame, a vacuum blower mounted above said bin, a flexible hose having its inner end leading to said bin and its outer end carrying a nozzle, operator-controlled means for positioning said nozzle, and a leaf spring for supporting an intermediate portion of said hose above the operators head, said leaf spring being pivotally mounted at its inner end to permit sideways rocking movement thereof.

20. In a mobile vacuum trash collector, a frame, a bin swingably mounted on said frame for movement between receiving and discharging positions, a lid for said bin, means pivoting said lid to said frame on a horizontal axis so that the lid is retractable from the bin to permit swinging movement thereof, the lid forming a plenum chamber above the bin, a hose inlet for said lid, a flexible hose extending from said inlet and having a nozzle at its outer end, means for controlling the position of said nozzle, and a leaf spring supporting an intermediate portion of said hose and pivoted to said lid on an angle transverse to the lid pivot.

21. In a mobile vacuum trash collector, a frame, a bin movably mounted on said frame for movement between receiving and emptying positions, a lid, means movably mounting said lid on said frame whereby the lid is retractable from said bin to permit movement thereof to its emptying position, a flexible hose extending from said lid and having a nozzle at its outer end, means resiliently supporting an intermediate portion of said hose above the operator, and a telescoping connection between said intermediate portion of the hose and said nozzle, said telescoping connection being pivoted at its opposite ends to the hose support and nozzle respectively and having a handle at an intermediate portion thereof.

22. The combination according to claim 1, further provided with resilient means carried by said frame and supporting said hose, said means for maneuvering the nozzle comprising a rod having one end secured to the nozzle, said rod carrying a handle accessible to an operator seated on the vehicle.

* * * * *